(12) United States Patent
Hirayama

(10) Patent No.: US 12,032,233 B2
(45) Date of Patent: Jul. 9, 2024

(54) LIGHT STIPPLING DISPLAY DEVICE

(71) Applicant: Shozo Hirayama, Tokyo (JP)

(72) Inventor: Shozo Hirayama, Tokyo (JP)

( * ) Notice: Subject to any disclaimer, the term of this patent is extended or adjusted under 35 U.S.C. 154(b) by 325 days.

(21) Appl. No.: 17/441,497

(22) PCT Filed: Mar. 18, 2020

(86) PCT No.: PCT/JP2020/011919
§ 371 (c)(1),
(2) Date: Sep. 21, 2021

(87) PCT Pub. No.: WO2020/196143
PCT Pub. Date: Oct. 1, 2020

(65) Prior Publication Data
US 2022/0179249 A1    Jun. 9, 2022

(30) Foreign Application Priority Data

Mar. 22, 2019   (JP) ................. 2019-055028

(51) Int. Cl.
*G02F 1/09*     (2006.01)
*G02F 1/095*    (2006.01)

(52) U.S. Cl.
CPC .............. *G02F 1/094* (2021.01); *G02F 1/095* (2013.01)

(58) Field of Classification Search
CPC .......... G02F 1/094; G02F 1/095; G09F 9/375; G09F 13/04; G09F 9/37
USPC ................. 359/237, 238, 240, 280
See application file for complete search history.

(56) References Cited

U.S. PATENT DOCUMENTS

| | | |
|---|---|---|
| 4,983,956 A | 1/1991 | Salam |
| 6,244,872 B1 | 6/2001 | Hirayama |

FOREIGN PATENT DOCUMENTS

| | | |
|---|---|---|
| CN | 201364397 Y | 12/2009 |
| CN | 104076508 A | 10/2014 |
| JP | S399450 Y1 | 4/1964 |
| JP | S4637207 Y1 | 12/1971 |
| JP | S483495 U | 1/1973 |
| JP | S4811123 A | 2/1973 |
| JP | S4815494 A | 2/1973 |

(Continued)

OTHER PUBLICATIONS

Office Action received for Chinese Patent Application No. 202080022336.1, dated Dec. 5, 2022, 10 pages (2 pages of English translation and 8 pages of Official copy).

(Continued)

*Primary Examiner* — Tuyen Tra
(74) *Attorney, Agent, or Firm* — AEON Law, PLLC; Adam L. K. Philipp; James Namiki

(57) ABSTRACT

A display device according to the present invention is a light stippling display device that performs light stippling. In the device, a plurality of hole portions are formed on a display plate portion including a magnetized sheet which is magnetized on both sides, and the hole portion is opened and closed by a light shielding body made of a magnetic ball. Thereby, the position of the light shielding body is switched between a light transmitting state and a light shielding state. The light shielding body has directivity for a center of the hole portion in the display plate portion which is magnetized on both sides in a case where the light shielding body is switched to the light shielding state. Therefore, the reliability of display can be improved, and the operability can be improved.

5 Claims, 7 Drawing Sheets

(56) References Cited

FOREIGN PATENT DOCUMENTS

| | | |
|---|---|---|
| JP | S5136028 A | 3/1976 |
| JP | S51146924 A | 12/1976 |
| JP | S5428382 U | 2/1979 |
| JP | S54138747 U | 9/1979 |
| JP | S5590489 U | 6/1980 |
| JP | S55142381 A | 11/1980 |
| JP | S6054172 U | 4/1985 |
| JP | S60129784 A | 7/1985 |
| JP | S60241084 A | 11/1985 |
| JP | S61160485 U | 10/1986 |
| JP | S63136077 A | 6/1988 |
| JP | H0337481 U | 4/1991 |
| JP | H06102830 A | 4/1994 |
| JP | H06250592 A | 9/1994 |
| JP | H10123986 A | 5/1998 |
| JP | 2000259083 A | 9/2000 |
| JP | 3236244 B2 | 12/2001 |
| JP | 2005043756 A | 2/2005 |
| JP | 2005084345 A | 3/2005 |
| JP | 2008197346 A | 8/2008 |
| JP | 2008299230 A | 12/2008 |
| JP | 2010276867 A | 12/2010 |
| JP | 2011027815 A | 2/2011 |
| JP | 2013088644 A | 5/2013 |

OTHER PUBLICATIONS

PCT International Search Report, International Application No. PCT/JP2020/011919, dated Jun. 2, 2020, 4 pages (2 pages of Official copy and 2 pages of English Translation).

Extended European Search Report for EP Patent Application No. 20777491.0, dated Nov. 21, 2022, 11 pages.

Office Action; Chinese Patent Application No. 98800894.7; dated Nov. 15, 2002; 8 pages (4 pages of Official copy and 4 pages of English translation).

Office Action; Japanese Patent Application No. H09-154346; dated May 9, 2000; 8 pages (4 pages of Official copy and 4 pages of English translation).

Notice of Allowance received for CN Patent Application No. 202080022336.1, dated Jun. 29, 2023, 8 pages (4 pages of Official copy and 4 pages of English translation).

LIGHT STIPPLING DISPLAY DEVICE

CROSS-REFERENCE TO RELATED CASES

This application is a U.S. national phase entry of, and claims priority to, PCT International Phase Application No. PCT/JP2020/011919, filed Mar. 18, 2020, which priority to Japanese Patent Application No. 2019-055028, filed Mar. 22, 2019. The entire contents of the above-referenced applications and of all priority documents referenced in the Application Data Sheet filed herewith are hereby incorporated by reference for all purposes.

TECHNICAL FIELD

The present invention relates to a technique that is suitable for use in a light stippling display device.

BACKGROUND ART

The present inventor has already applied for Patent Document 1 as a light stippling display device that can be used for a blackboard, a whiteboard, a painting tool for children, or the like.

Patent Document 1 describes a plurality of types of light stippling display devices in which a plurality of small holes are provided on a plate portion, a light source is provided on a rear surface side of the plate portion, and a light shielding body is provided in each small hole and which performs light stippling by moving the light shielding body.

In Patent Document 1, it is found that a configuration in which a hole portion formed on a plate-shaped magnet can be shielded by a ball having a diameter larger than a diameter of the hole portion has a very high possibility of development.

CITATION LIST

Patent Document

[Patent Document 1]
Japanese Patent No. 3236244

SUMMARY OF INVENTION

Technical Problem

However, in the configuration described in Patent Document 1, there is a demand for improving the reliability of display when the plurality of hole portions are shielded or when the hole portions are opened.

Specifically, in order to make one hole portion be in a light shielding state of being shielded, it is necessary to fit a ball as a light shielding body into the hole portion at a central position (center position) of the hole portion in a specified depth. That is, it is necessary that the center of the hole portion and the center of the light shielding body match with each other when viewed from the front surface.

On the other hand, in the light shielding state, the light shielding body may not be firmly fitted to the center position of the hole portion.

Further, the light shielding body is removed from the hole portion by bring an object into contact with the light shielding body in the light shielding state from the front surface side or pressing the light shielding body in the light shielding state from the front surface side. However, the light shielding body may not be removed, and as a result, a clear display state may not be obtained.

The present invention has been made in view of the above circumstances, and aims to achieve the following objects.
1. To improve the accuracy of the light shielding state for each hole portion.
2. To improve the display performance in each hole portion.
3. To improve the operability.
4. To improve visibility and visuality, such as widening of the viewing angle.

Solution to Problem

The present inventor wanted to improve light shielding performance in development of a light stippling display device. For this reason, the present inventor tried to find a cause in a case where the light shielding body (ball) is not located at the center position of the hole portion.

As a result, the present inventor found that improvement can be made by a plate-shaped magnet on which a hole portion is formed, that is, a form of magnetization (magnetization method) in a plastic magnet sheet.

Further, the present inventor wanted to improve operability in development of a light stippling display device. For this reason, the present inventor tried to optimize the position of the light shielding body (ball) with respect to an opening of the hole portion and a state where the light shielding body (ball) is attracted to the hole portion.

As a result, the present inventor found that operability can be improved by defining dimensions including a diameter dimension of the light shielding body (ball), a diameter dimension of the opening of the hole portion, a thickness dimension of the plate-shaped magnet, that is, the plastic magnet sheet, and a distance dimension between the plate-shaped magnet and the light shielding body (ball) in the display state and defining relationships among the dimensions.

Further, the present inventor found that an improvement in visibility and an improvement in visuality can be made by defining the dimensional relationships.

Further, in a commercial sheet-shaped magnet, a form of magnetization is almost a form of single-sided two-pole magnetization. However, in the form, it is necessary that setting of a pitch between the hole portions provided on the display plate portion and setting of a pitch between the poles magnetized by single-sided two-pole magnetization match with each other. At the same time, it is also necessary that the position of the pole of the magnetized sheet and a formation position of the hole portion match with each other.

In a case where the conditions are not satisfied, in the light shielding state, the light shielding body (ball) does not match with the hole portion, that is, the hole portion is not completely closed. As a result, light is not completely shielded, and display is incomplete. Thus, this is not preferable.

Further, in a case where it is desired to satisfy the conditions, the conditions for sheet processing become complicated, the number of processing steps increases, and a processing cost increases. As a result, this is not preferable.

In view of the above circumstances, according to an aspect of the present invention, there is provided a light stippling display device including: a display plate portion that is erectly provided and has a front surface side of the display plate portion on which a plurality of hole portions are formed; and a light shielding body that is provided corresponding to each hole portion, in which the light stippling display device performs light stippling by allowing light transmitting and light shielding from a rear surface side of the display plate portion to the front surface side by moving the light shielding body, the display plate portion is formed of a magnetized sheet which is magnetized, the light shielding body is a magnetic ball having a spherical shape, a light-transmitting holder including a tubular portion in which the light shielding body rolls and moves is provided on the rear surface side of the display plate portion, the tubular portion being provided corresponding to each hole portion, the position of the light shielding body is switched between a light transmitting state and a light shielding state, the light transmitting state being a state where the light shielding body is disposed in the light-transmitting holder at a position separated from the display plate portion, and the light shielding state being a state where the light shielding body is attracted by a magnetic force of the display plate portion and is fitted into the hole portion, and the light shielding body has directivity for a center of the hole portion in the display plate portion which is magnetized on both sides in a case where the light shielding body is switched to the light shielding state. Thereby, the above problems can be solved.

In the light stippling display device according to the aspect of the present invention, in the light shielding state, the light shielding body may be in a state of protruding from an opening of the hole portion within a range of one-fourth of the diameter of the light shielding body to one-third of the diameter of the light shielding body.

In the aspect of the present invention, preferably, a ratio of a diameter dimension of the opening of the hole portion to a diameter dimension of the light shielding body is set to be within a range of 0.86 to 0.95.

Further, in the aspect of the present invention, in the display plate portion, a configuration in which the thickness dimension of the magnetized sheet is set to be within a range of 0.05 mm to 0.3 mm may be adopted.

In the light stippling display device according to the aspect of the present invention, a ratio of a length dimension of the tubular portion of the light-transmitting holder to a diameter dimension of the light shielding body may be set to be within a range of 2.5 to 3.0.

In the light stippling display device according to the aspect of the present invention, a ratio of a diameter dimension of the light shielding body to a thickness dimension of the magnetized sheet may be set to be within a range of 6 to 10.

According to another aspect of the present invention, there is provided a light stippling display device including: a display plate portion that is erectly provided and has a front surface side on which a plurality of hole portions are formed; and a light shielding body that is provided corresponding to each hole portion, in which the light stippling display device performs light stippling by allowing light transmitting and light shielding from a rear surface side to the front surface side by moving the light shielding body, the display plate portion is formed of a magnetized sheet which is magnetized, the light shielding body is a magnetic ball having a spherical shape, a light-transmitting holder including a tubular portion in which the light shielding body rolls and moves is provided on the rear surface side of the display plate portion, the tubular portion being provided corresponding to each hole portion, the position of the light shielding body is switched between a light transmitting state and a light shielding state, the light transmitting state being a state where the light shielding body is disposed in the light-transmitting holder at a position separated from the display plate portion, and the light shielding state being a state where the light shielding body is attracted by a magnetic force of the display plate portion and is fitted into the hole portion, and the light shielding body has directivity for a center of the hole portion in the display plate portion which is magnetized on both sides in a case where the light shielding body is switched to the light shielding state.

Thereby, the display plate portion is magnetized on both sides. Thus, a magnetic force is formed in the vicinity of the hole portion by the magnetized display plate portion in a shape such that the light shielding body is attracted toward a center position of the hole portion.

That is, a flux of magnetic force can be formed in the vicinity of the hole portion in an axis-symmetrical shape with respect to an axial line passing through the center of the hole portion and serving as a normal line of the display plate portion and in a shape symmetrical with respect to the surface of the display plate portion.

Therefore, in a case where the light shielding body is switched from the light transmitting state to the light shielding state, the light shielding body having directivity for the center of the hole portion is attracted by the magnetic force of the display plate portion. Thus, the light shielding body can be neatly fitted to the center position of the hole portion.

Further, in the light shielding state, the light shielding body is attracted by the magnetic force of the display plate portion, and the magnetic force has directivity for the center of the hole portion. Thus, it is possible to maintain a state where the light shielding body is fitted to the center position of the hole portion.

Thereby, a state where the light shielding body is fitted into the center position of the hole portion can be reliably realized, and thus light shielding can be reliably ensured in all of the plurality of the hole portions. Therefore, the light stippling display device can reliably perform display.

In the light stippling display device according to the aspect of the present invention, in the light shielding state, the light shielding body is in a state of protruding from an opening of the hole portion within a range of one-fourth of a diameter of the light shielding body to one-third of the diameter of the light shielding body.

Thereby, in the light shielding state, by pressing the spherical light shielding body protruding from the hole portion, the light shielding body is removed from the hole portion. Thus, the light shielding body can be easily switched to the light transmitting state. Further, in a case where the light shielding body is switched from the light transmitting state to the light shielding state, the light shielding body which is a spherical magnetic ball can be easily fitted into the hole portion only by the magnetic force of the display plate portion.

Therefore, in the light stippling display device, operability can be improved, and thus the reliability of display can be improved.

Here, a state where the light shielding body protrudes from an opening of the hole portion within a range of one-fourth of a diameter of the light shielding body to one-third of the diameter of the light shielding body means that a distance from a center position of a circle formed by bring the light shielding body into contact with the opening of the hole portion to a position at which an outer surface of the light shielding body having a spherical surface is located outside the opening of the hole portion is within a range of one-fourth of the diameter of the light shielding body to one-third of the diameter of the light shielding body.

Preferably, the light shielding body protrudes from the opening of the hole portion by approximately half of a radius of the light shielding body.

In the aspect of the present invention, a ratio of a diameter dimension of the opening of the hole portion to a diameter dimension of the light shielding body is set to be within a range of 0.86 to 0.95.

Thereby, in the light shielding state, a state where the light shielding body protrudes from the opening of the hole portion by half of the radius of the light shielding body can be realized. Thereby, in the light shielding state, by pressing the spherical light shielding body protruding from the hole portion, the light shielding body is removed from the hole portion. Thus, the light shielding body can be easily switched to the light transmitting state. Further, in a case where the light shielding body is switched from the light transmitting state to the light shielding state, the light shielding body which is a spherical magnetic ball can be easily fitted into the hole portion only by the magnetic force of the display plate portion.

Therefore, in the light stippling display device, operability can be improved, and thus the reliability of display can be improved.

Further, in the aspect of the present invention, in the display plate portion, a thickness dimension of the magnetized sheet is set to be within a range of 0.05 mm to 0.3 mm.

Thereby, the magnetized sheet can have the magnetic force required to fit the light shielding body in the vicinity of the hole portion such that the light shielding body is switched to the light shielding state. At the same time, the magnetized sheet does not have an unnecessarily strong magnetic force in a case where the light shielding body in the light shielding state is switched to the light transmitting state by being pressed and removed from the hole portion. Therefore, the light shielding body can be smoothly switched between the light transmitting state and the light shielding state, and thus the operability can be improved.

Further, since the thickness of the magnetized sheet can be reduced, it is possible to reduce the area in which the display light displayed from the rear surface side through the hole portion cannot be visually recognized due to the thickness of the magnetized sheet. Thereby, the viewing angle for display on the display plate portion can be widened. Thus, the visual recognition state of the display from an oblique direction can be improved. Further, it is possible to ensure the visual recognition state of the display from the front surface of the display plate portion.

In the light stippling display device according to the aspect of the present invention, the ratio of the length dimension of the tubular portion of the light-transmitting holder to the diameter dimension of the light shielding body is set to be within a range of 2.5 to 3.0.

Thereby, the light shielding body is switched between the light shielding state and the light transmitting state, the light shielding state being a state where the light shielding body is fitted into the display plate portion on one end side serving as a front surface side of the tubular portion of the light-transmitting holder, and the light transmitting state being a state where the light shielding body is located on the other end side serving as a rear surface side of the tubular portion of the light-transmitting holder. Therefore, in the light stippling display device, the clearness of display can be improved.

Further, in the light transmitting state where the light shielding body is located on the other end side in the tubular portion of the light-transmitting holder, the display light which is incident from the rear surface side can be efficiently guided to the front surface side of the display plate portion. Thereby, the light shielding body that becomes a shadow in the light transmitting state is in a so-called whiteout state. Thus, it is possible to reduce the degree to which the light shielding body is visually recognized from the front surface side of the display plate portion. Therefore, in the light stippling display device, the clearness of display can be improved.

In the light stippling display device according to the aspect of the present invention, the ratio of the diameter dimension of the light shielding body to the thickness dimension of the magnetized sheet is set to be within a range of 6 to 10.

Thereby, the relationship between the magnetized sheet and the light shielding body can satisfy a magnetic state required to properly switch the light shielding body to the light shielding state by fitting the light shielding body into the hole portion and to switch the light shielding body in the light shielding state to the light transmitting state by removing the light shielding body from the hole portion. Therefore, the light shielding body can be smoothly switched between the light transmitting state and the light shielding state, and thus operability can be improved.

Further, the relationship between the magnetized sheet and the light shielding body can satisfy a condition required to improve visibility by widening a viewing angle for display on the display plate portion.

Further, in the light stippling display device according to the aspect of the present invention, the light-transmitting holder may include a light guide plate portion that is provided on the rear surface side, faces the display plate portion in parallel, and closes the tubular portion.

Thereby, the light from the rear surface side can be efficiently guided to the front surface side by the light-transmitting holder. Thus, a uniform display state can be realized on the entire surface of the light stippling display device. At the same time, in a case where a light source, that is, a backlight is provided on the rear surface side, display light from the backlight can be effectively guided to the front surface side without attenuation. Thus, it is possible to reduce a size of the backlight and reduce the required driving power.

Further, durability of the light-transmitting holder can be improved by the light guide plate portion, and thus the display plate portion can be prevented from being deformed. Thereby, it is possible to prevent the light shielding body from not being fitted into the hole portion. Therefore, the reliability of display can be improved, and the reliability of an operation can be improved. Further, the durability of the light-transmitting holder is improved, and thus it is possible to reduce the weight of the light stippling display device.

In the light stippling display device according to the aspect of the present invention, the ratio of the thickness dimension of the light guide plate portion of the light-transmitting holder to a diameter dimension of the light shielding body may be set to be within a range of 1.7 to 1.8.

Thereby, the light guide plate portion exhibits a sufficient light guide effect, and the light shielding body that is viewed as a shadow is in a so-called whiteout state. Thus, it is possible to reduce a degree to which the light shielding body is visually recognized from the front surface side of the display plate portion. Therefore, in the light stippling display device, clearness of display can be improved.

In the light stippling display device according to the aspect of the present invention, a cover plate portion made of a magnetic material may be provided on the front surface side of the magnetized sheet of the display plate portion.

Thereby, it is possible to improve durability of the display plate portion without affecting the magnetic relationship between the light shielding body and the magnetized sheet. Further, when the light shielding body is switched to a display state, even in a case where drawing means comes into contact with the front surface side of the display plate portion, on the front surface side of the display plate portion, it is possible to prevent the magnetized sheet from being scratched or the hole portion from being deformed. Therefore, a good display state can be maintained.

Advantageous Effects of Invention

According to the present invention, the following effects can be obtained.

The light shielding body is reliably located on the center of the hole portion, and thus the light shielding state can be improved. Further, the light shielding body is smoothly switched to the light transmitting state, and thus operability can be improved. Thereby, clearness of display can be improved. Further, the viewing angle can be widened, and thus visibility of display can be improved. Therefore, it is possible to provide a light stippling display device capable of exhibiting the above effects.

DESCRIPTION OF EMBODIMENTS

Hereinafter, a first embodiment of a light stippling display device according to the present invention will be described with reference to the drawings.

Figure 1:
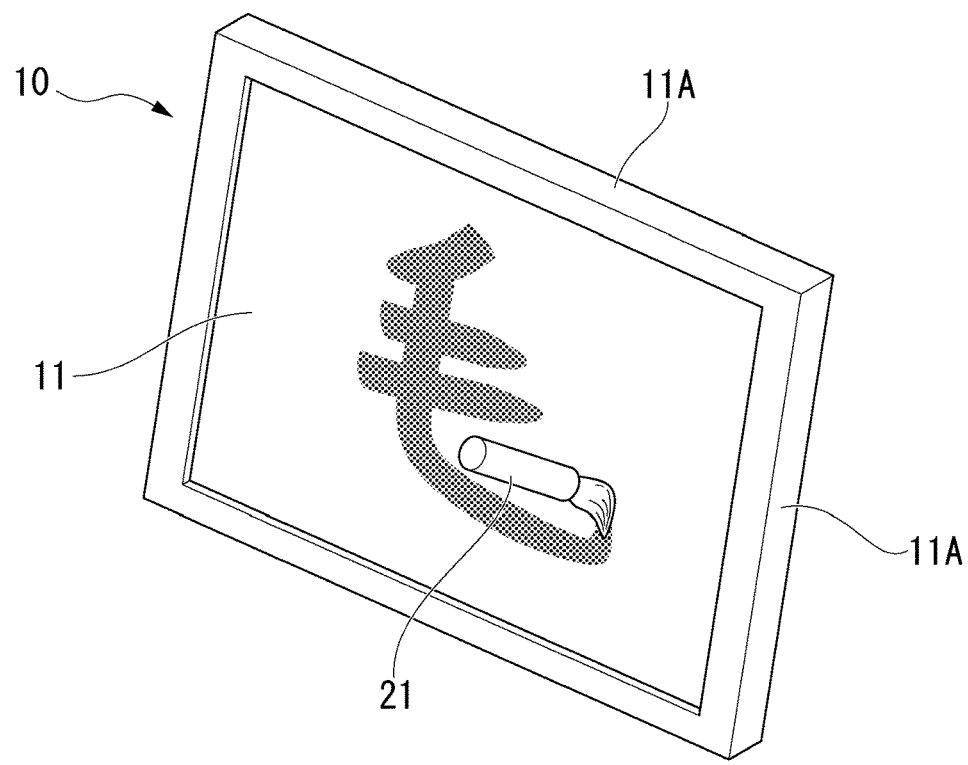
FIG. 1 is a perspective view showing a light stippling display device according to a first embodiment of the present invention.
Figure 2:
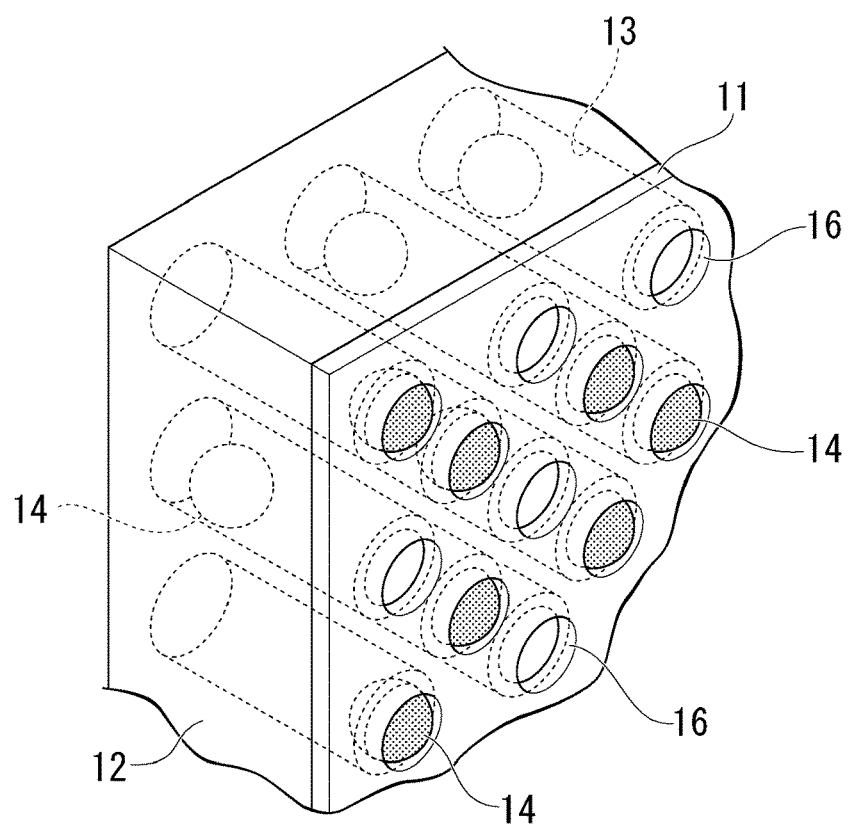
FIG. 2 is an enlarged perspective view showing a relationship between a display plate portion, a light shielding body, and a light-transmitting holder of the light stippling display device according to the first embodiment of the present invention.

FIG. 1 is a perspective view showing a light stippling display device according to the present embodiment. FIG. 2 is an enlarged perspective view showing a relationship among a display plate portion, a light shielding body, and a light-transmitting holder of the light stippling display device according to the present embodiment. In FIGS. 1 and 2, the light stippling display device is referenced by a reference numeral 10.

As shown in FIG. 1, the light stippling display device 10 according to the present embodiment has a plate shape, and includes a display plate portion 11, which has a rectangular contour and of which a front surface serves as a display board, and a frame portion 11A surrounding the periphery of the display plate portion 11. The light stippling display device 10 is disposed at a predetermined angle such that the display plate portion 11 faces upward, and is used in this state. The frame portion 11A may not be provided.

As shown in FIG. 2, the light stippling display device 10 according to the present embodiment includes a light-transmitting holder 12 which is disposed on a rear surface of the display plate portion 11, a light shielding body 14 which is accommodated in a tubular portion 13 formed in the light-transmitting holder 12, and a backlight 15.

Figure 3:
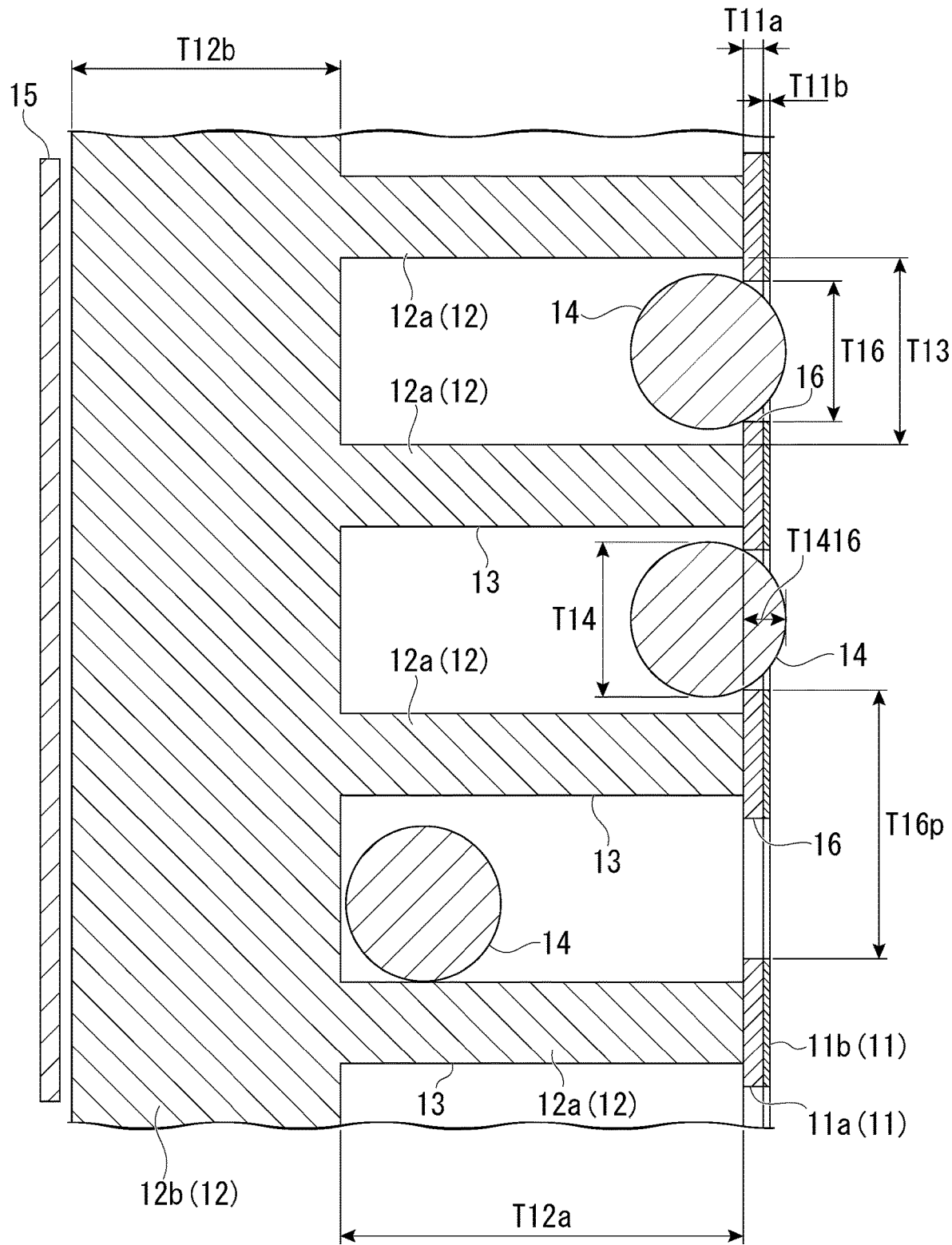
FIG. 3 is an enlarged sectional view showing each dimension of the light stippling display device according to the first embodiment of the present invention.

FIG. 3 is an enlarged sectional view showing the display plate portion, the light shielding body, and the light-transmitting holder of the light stippling display device according to the present embodiment.

A plurality of hole portions 16 are formed on the display plate portion 11. A plurality of tubular portions 13 are formed in the light-transmitting holder 12. The light shielding body 14 is accommodated in the tubular portion 13. The light shielding body 14 is a magnetic ball having a spherical shape.

The display plate portion 11 includes a magnetized sheet 11a which is provided on the tubular portion 13 side and a cover plate portion 11b which is provided on a front surface side, the magnetized sheet 11a and the cover plate portion 11b being stacked. The cover plate portion 11b protects the front surface side of the display plate portion 11. The cover plate portion 11b is made of a magnetic material, and is made of, for example, stainless steel (SUS430) or SPCC (cold-rolled steel sheet).

The magnetized sheet 11a has a magnetic force such that the light shielding body 14 is attracted and is fitted into the hole portion 16.

The magnetized sheet 11a is magnetized on both sides. That is, in a case where a front surface of the magnetized sheet 11a is an N pole, a rear surface of the magnetized sheet 11a is an S pole. Alternatively, in a case where a front surface of the magnetized sheet 11*a* is an S pole, a rear surface of the magnetized sheet 11*a* is an N pole.

The magnetized sheet 11*a* may be a resin-bonded magnet sheet, that is, a plastic magnetized sheet or a rubber magnetized sheet.

In manufacture of the display plate portion 11, first, the magnetized sheet 11*a* and the cover plate portion 11*b* are bonded together. Thereafter, a plurality of hole portions 16 are formed by punching or the like. Further, the magnetized sheet 11*a* is magnetized so as to be in a predetermined state.

The hole portion 16 penetrates through the display plate portion 11. An opening contour of the hole portion 16 has a circular shape, and is set to have a diameter smaller than a diameter of the light shielding body 14 having a spherical shape.

Figure 4:
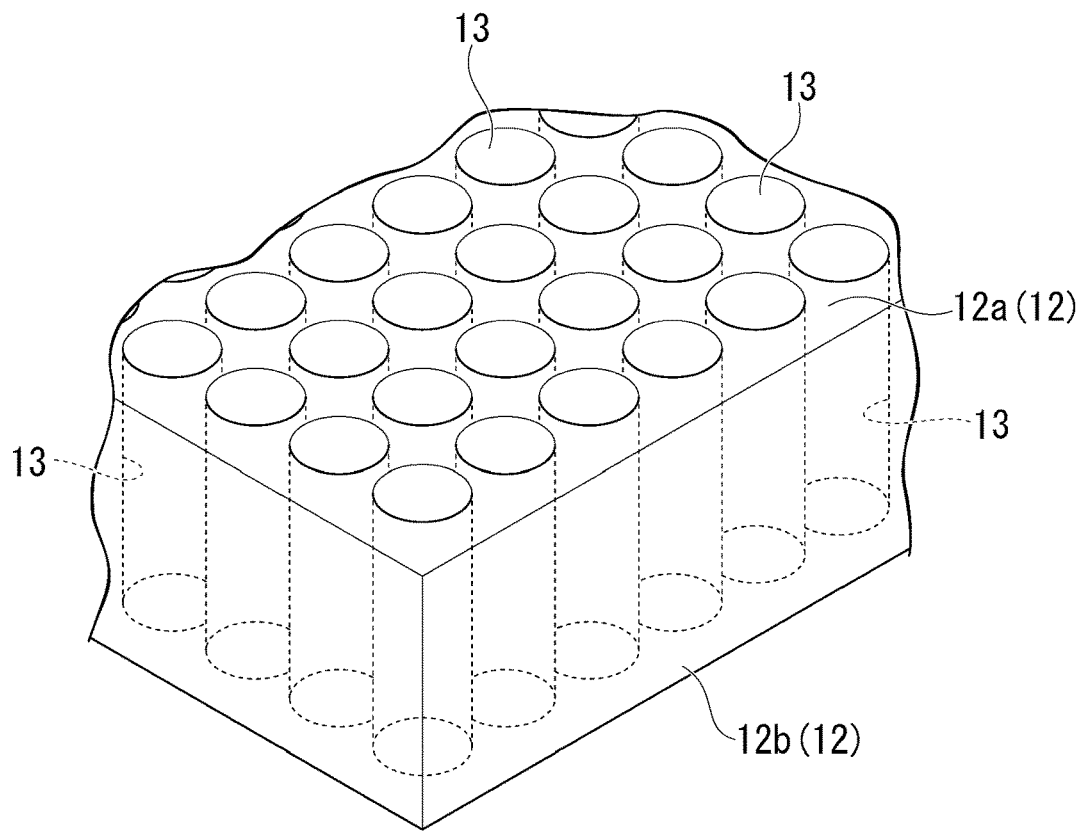
FIG. 4 is a perspective view showing the light-transmitting holder of the light stippling display device according to the first embodiment of the present invention.

FIG. 4 is an enlarged perspective view showing the light-transmitting holder of the light stippling display device according to the present embodiment.

A plurality of tubular portions 13 are formed in the light-transmitting holder 12, as bottomed cylindrical recess portions.

The light-transmitting holder 12 includes a side wall portion 12*a* on which the tubular portions 13 are formed, and a light guide plate portion 12*b* which is provided on a rear surface side. The side wall portion 12*a* and the light guide plate portion 12*b* are integrally formed.

The light guide plate portion 12*b* has a plate shape so as to parallelly face the display plate portion 11. The light guide plate portion 12*b* serves as a bottom surface of the tubular portion 13, and closes the tubular portion 13.

The side wall portion 12*a* is erected from the light guide plate portion 12*b* toward the display plate portion 11.

The side wall portion 12*a* is formed so as to surround the periphery of a space serving as the tubular portion 13. The side wall portion 12*a* is formed corresponding to a region serving as a display surface of the display plate portion 11. The side wall portions 12*a* are formed in a continuous state so as to separate the adjacent tubular portions 13 from each other.

Openings of the tubular portions 13 are disposed at positions corresponding to the hole portions 16 in a direction parallel to the front surface of the display plate portion 11. Specifically, the positions of the light-transmitting holder 12 and the display plate portion 11 are set such that an axial line of the cylindrical tubular portion 13 matches with an opening center of the hole portion 16.

The tubular portion 13 is provided such that the axial line of the cylindrical tubular portion 13 matches with a normal direction of the display plate portion 11. The plurality of tubular portions 13 are all disposed such that the axial lines of the cylindrical tubular portions 13 are parallel to each other.

The tubular portion 13 is set such that a sectional contour parallel to the front surface of the display plate portion 11 has a circular shape and a diameter is larger than a diameter of the light shielding body 14 having a spherical shape. The sectional shape of the tubular portion 13 is not limited thereto as long as the light shielding body 14 can roll and move between an opening side which is in contact with the magnetized sheet 11*a* and the light guide plate portion 12*b* side in the tubular portion 13.

The tubular portion 13 has the same sectional shape from the opening side which is in contact with the magnetized sheet 11*a* to the light guide plate portion 12*b* side. The sectional shape of the tubular portion 13 is not limited thereto as long as the light shielding body 14 moves and reaches the light guide plate portion 12*b* side in the tubular portion 13 such that a light transmitting state to be described can be achieved.

The light-transmitting holder 12 is made of a transparent resin, and is made of, for example, an ABS resin. The light-transmitting holder 12 may be formed by injection molding.

The light shielding body 14 may be, for example, an iron ball, specifically, a carbon steel ball or the like.

The backlight 15 is a light source such as an LED or a cold cathode tube that emits display light, and is formed corresponding to a region to be a display surface of the display plate portion 11.

The backlight 15 can be disposed such that the display light can transmit through all the hole portions 16 formed on the display plate portion 11. The backlight 15 is connected to a power supply (not shown), and can emit light.

Figure 5:
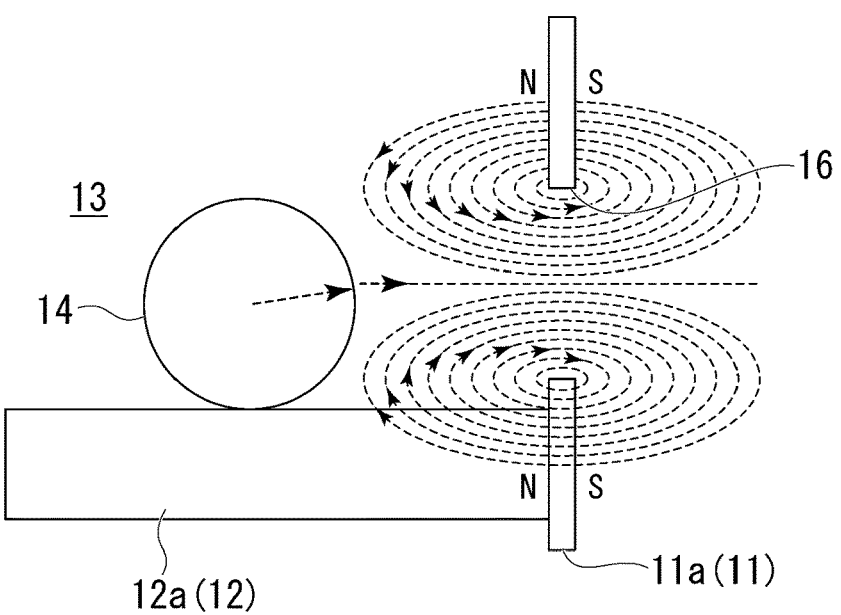
FIG. 5 is a schematic sectional view showing a relationship between a magnetic field formed by a magnetized sheet and the light shielding body in the light stippling display device according to the first embodiment of the present invention.
Figure 6:
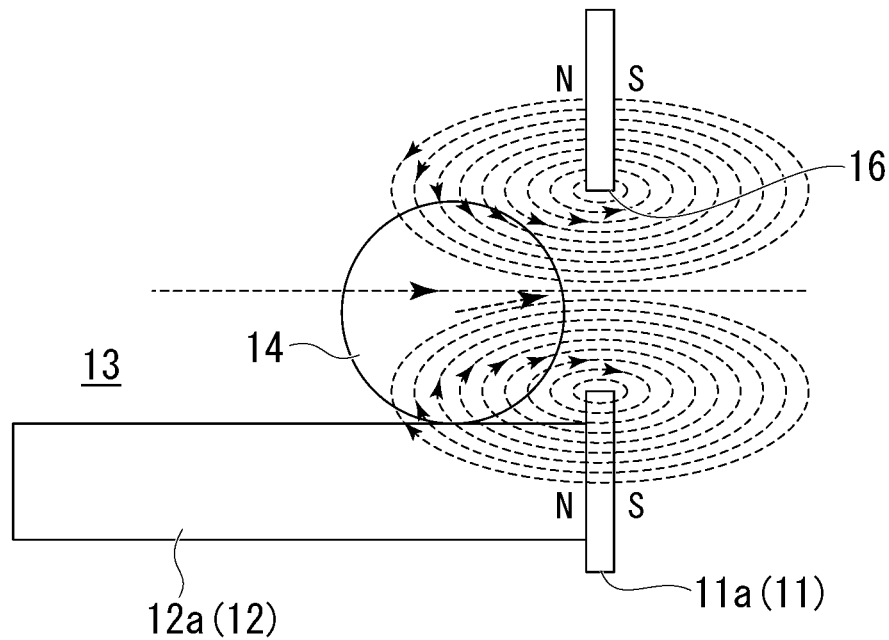
FIG. 6 is a schematic sectional view showing a relationship between a magnetic field formed by a magnetized sheet and the light shielding body in the light stippling display device according to the first embodiment of the present invention.
Figure 7:
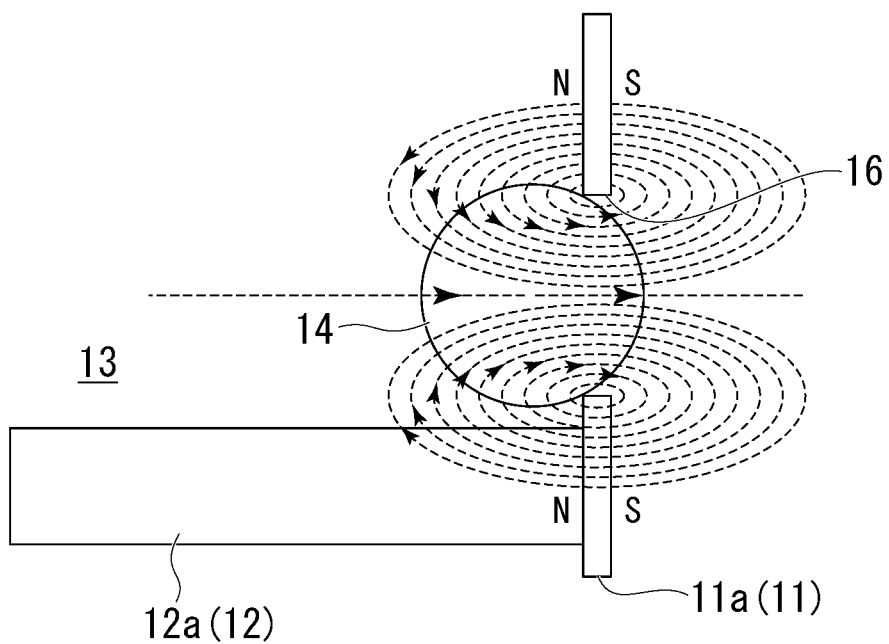
FIG. 7 is a schematic sectional view showing a relationship between a magnetic field formed by a magnetized sheet and the light shielding body in the light stippling display device according to the first embodiment of the present invention.

FIGS. 5 to 7 are schematic sectional views showing a relationship between a magnetic field formed by the magnetized sheet and the light shielding body in the light stippling display device according to the present embodiment.

In the light stippling display device 10 according to the present embodiment, in an initial state, as shown in FIG. 7, all the light shielding bodies 14 are attracted by the magnetic force of the magnetized sheet 11*a* of the display plate portion 11, and are fitted into the hole portions 16. This state is a light shielding state.

The specific light shielding body 14 is pressed from the front surface side of the display plate portion 11, and is released from the magnetic force of the magnetized sheet 11*a*. Thus, the specific light shielding body 14 is separated from the hole portion 16. The specific light shielding body 14 rolls and moves in the tubular portion 13, and moves toward the light guide plate portion 12*b*. The light shielding body 14 located on the light guide plate portion 12*b* side in the tubular portion 13 is in a so-called whiteout state due to the display light which is emitted from the backlight 15 (refer to FIG. 3) and is guided by the light guide plate portion 12*b*. Thereby, a shadow of the light shielding body 14 becomes almost invisible from a front surface side of the hole portion 16. Therefore, the light shielding body 14 can be switched to a light transmitting state.

When the display plate portion 11 is viewed from the front surface side, the display light from the backlight 15 transmits through the hole portion 16 from which the light shielding body 14 is removed. On the other hand, in a case where the light shielding body 14 is not pressed and the light shielding body 14 is still fitted into the hole portion 16, the display light from the backlight 15 is shielded. Therefore, a predetermined display can be performed by disposition of the hole portions 16 in the light transmitting state.

In the light stippling display device 10 according to the present embodiment, both sides of the magnetized sheet 11*a* is magnetized. Thus, as shown in FIGS. 5 to 7, a flux of magnetic force is formed between the front surface and the rear surface of the magnetized sheet 11*a* so as to pass through the inside of the hole portion 16. The flux of magnetic force that is formed by the magnetized sheet 11*a* is formed in point symmetry with respect to a center of the hole portion 16. Further, the flux of magnetic force that is formed by the magnetized sheet 11*a* is formed in line symmetry with respect to an axial line of the hole portion 16. That is, the flux of magnetic force that is formed by the magnetized sheet 11*a* has directivity for the center of the hole portion 16 with respect to the light shielding body 14 having a spherical shape.

For this reason, as shown in FIG. 5, the light shielding body 14 in the tubular portion 13 is attracted along the axial line of the hole portion 16 in a case where the light shielding body 14 is switched from the light transmitting state to the light shielding state. Therefore, as shown in FIG. 6, the light shielding body 14 does not move to a position deviated from the center of the hole portion 16 in a radial direction, but moves toward the center of the hole portion 16. As shown in FIG. 7, the light shielding body 14 is easily fitted to the center position of the hole portion 16.

Thereby, the light shielding body 14 is not in a halfway state of being attracted to the magnetized sheet 11a in a state of being disposed at a position deviated from the center position of the hole portion 16. Therefore, a light shielding state can be completely realized in all the hole portions 16.

Figure 8:
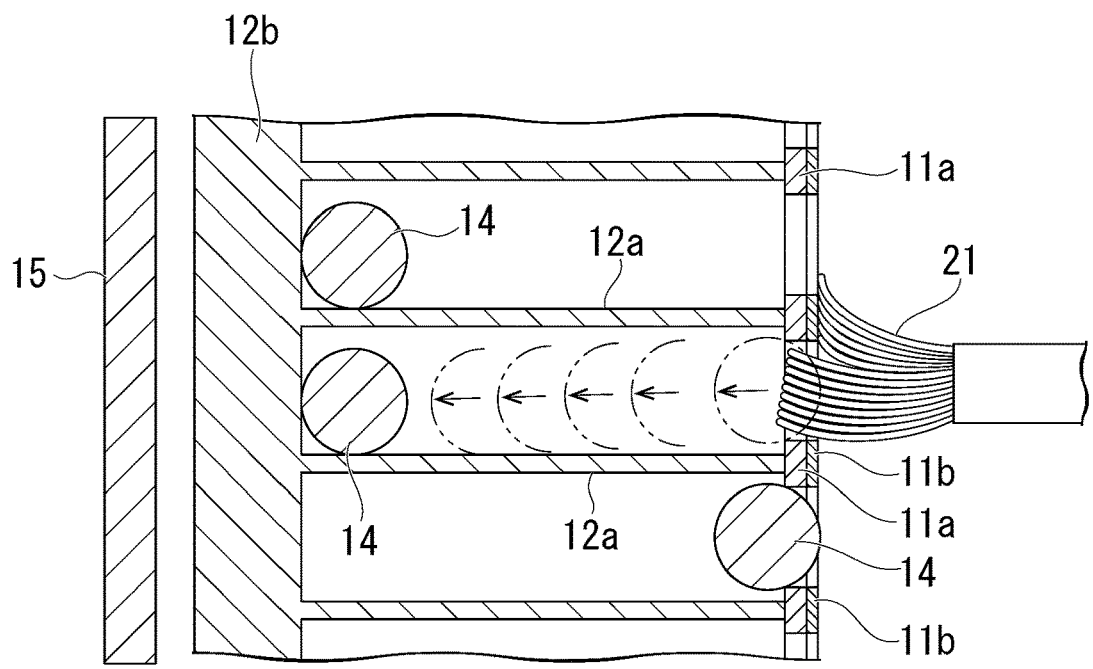
FIG. 8 is an enlarged sectional view showing an operation of the light shielding body in the light stippling display device according to the first embodiment of the present invention.

FIG. 8 is an enlarged sectional view showing an operation of the light shielding body of the light stippling display device according to the present embodiment.

In the light stippling display device 10 according to the present embodiment, in order to perform display by switching the light shielding body 14 from the light shielding state to the light transmitting state, as shown in FIG. 8, the light shielding body 14 fitted into the hole portion 16 at a corresponding portion is pressed by a brush (drawing means) 21. Thereby, the light shielding body 14 is released from the magnetic force of the magnetized sheet 11a, and is separated from the hole portion 16. Thus, the light shielding body 14 is switched to the light transmitting state.

The switching to the light transmitting state is not limited to switching by using the brush (drawing means) 21, and other means such as a brush, a finger, or a rod-shaped member having a soft head may be used.

Figure 9:
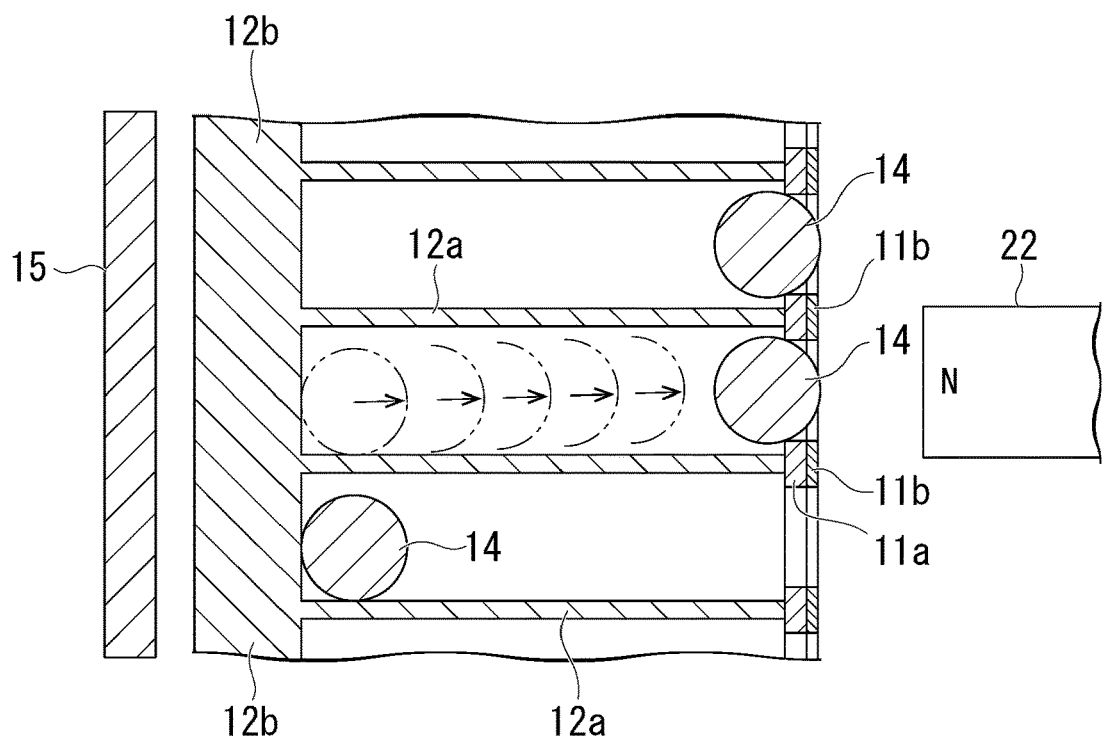
FIG. 9 is an enlarged sectional view showing an operation of the light shielding body in the light stippling display device according to the first embodiment of the present invention.

FIG. 9 is an enlarged sectional view showing an operation of the light shielding body of the light stippling display device according to the present embodiment.

In the light stippling display device 10 according to the present embodiment, in order to erase the display by switching the light shielding body 14 from the light transmitting state to the light shielding state, the light shielding body 14 located on the light guide plate portion 12b side is moved to the magnetized sheet 11a side. At this time, as shown in FIG. 9, in the tubular portion 13 in the light transmitting state, the light shielding body 14 located on the light guide plate portion 12b side is attracted and moved to the magnetized sheet 11a side by an eraser (erasing means) 22.

Here, the eraser (erasing means) 22 is a magnet of which a surface facing the cover plate portion 11b is formed as a magnetic pole different from the pole of the front surface of the magnetized sheet 11a.

Thereby, the light shielding body 14 moves in the tubular portion 13 toward the magnetized sheet 11a. The light shielding body 14 is fitted into the hole portion 16 so as to be located at the center of the hole portion 16 by the magnetic force of the magnetized sheet 11a. Thereby, the light shielding body 14 is switched to the light shielding state, and thus the display is erased.

In FIG. 9, N indicates an N pole of the magnet, and S indicates an S pole of the magnet. FIG. 9 shows a configuration in which the front surface side of the magnetized sheet 11a is an S pole and the facing surface of the eraser (erasing means) 22 is an N pole. On the other hand, a configuration in which the magnetic poles are switched may be adopted.

In a case of erasing the display on the entire surface of the display plate portion 11, the light stippling display device 10 itself is tilted such that an upper end frame portion 11A is moved toward the front surface. Thereby, the light shielding body 14 in the light transmitting state can also be moved to the magnetized sheet 11a at once. Even in this case, the light shielding body 14 is fitted into the hole portion 16 so as to be located at the center of the hole portion 16 by the magnetic force of the magnetized sheet 11a.

Further, the eraser (erasing means) 22 having a dimension equal to or slightly larger than a total length of the display plate portion 11 in a width direction is formed, and the eraser (erasing means) 22 is moved along a longitudinal direction of the display plate portion 11. Thereby, the display can be erased all at once on the entire surface of the display plate portion 11.

Next, a dimension of each portion of the light stippling display device 10 according to the present embodiment will be described.

The reference numerals shown in FIG. 3 represent the following dimensions.

T11a represents a thickness dimension of the magnetized sheet 11a.

T11b represents a thickness dimension of the cover plate portion 11b.

T12b represents a thickness dimension of the light guide plate portion 12b.

T12a represents a height dimension of the side wall portion 12a, that is, a length dimension (depth dimension) of the tubular portion 13.

T13 represents a diameter dimension of the tubular portion 13.

T14 represents a diameter of the light shielding body 14.

T1416 represents a dimension with which the light shielding body 14 in the light shielding state protrudes from the opening of the hole portion 16.

T16 represents a diameter dimension of the opening of the hole portion 16.

T16p represents a pitch dimension of the hole portion 16 (distance between the centers of the adjacent hole portions 16).

In the present embodiment, these dimensions are set as follows.

A ratio T1416/T14 of the dimension T1416, with which the light shielding body 14 in the light shielding state protrudes from the opening of the hole portion 16, to the diameter dimension T14 of the light shielding body 14 is within a range of 0.2 to 0.3. That is, preferably, the light shielding body 14 protrudes from the opening of the hole portion 16 by a length within a range of a half to three-second of a radius T14/2 of the light shielding body 14.

In a case where the ratio T1416/T14 is larger than a value within the range, it is difficult to remove the light shielding body 14 from the hole portion 16 when the light shielding body 14 is pressed. As a result, this is not preferable because operability is deteriorated. Further, in a case where the ratio T1416/T14 is smaller than a value within the range, the light shielding body 14 may not be reliably attracted by the magnetic force of the magnetized sheet 11a. As a result, this is not preferable because the light shielding body 14 may not completely be in the light shielding state.

A ratio T16/T14 of the diameter dimension T16 of the opening of the hole portion 16 to the diameter dimension T14 of the light shielding body 14 is within a range of 0.86 to 0.95.

In a case where the ratio T16/T14 deviates from the range, the value of the ratio T1416/T14 deviates from the range. As a result, this is not preferable.

The thickness dimension T11a of the magnetized sheet 11a is within a range of 0.02 mm to 0.3 mm, and more preferably, within a range of 0.05 mm to 0.1 mm.

In a case where the thickness dimension T11*a* of the magnetized sheet 11*a* is larger than a value within the range, an amount of light which transmits through the hole portion 16 in the light transmitting state is attenuated, and a viewing angle for display is narrowed. As a result, this is not preferable. Further, in a case where the thickness dimension T11*a* of the magnetized sheet 11*a* is smaller than a value within the range, the magnetic force required to attract the light shielding body 14 may be insufficient. As a result, this is not preferable.

The thickness dimension T11*b* of the cover plate portion 11*b* is within a range of 0.01 mm to 0.1 mm.

In a case where the thickness dimension T11*b* of the cover plate portion 11*b* is larger than a value within the range, an amount of light which transmits through the hole portion 16 in the light transmitting state is attenuated, and a viewing angle for display is narrowed. As a result, this is not preferable. Further, in a case where the thickness dimension T11*b* of the cover plate portion 11*b* is smaller than a value within the range, handling when bonding the magnetized sheet 11*a* and the cover plate portion 11*b* is deteriorated. As a result, this is not preferable.

A ratio T12*a*/T14 of the length dimension T12*a* of the tubular portion 13 in the light-transmitting holder 12 to the diameter dimension T14 of the light shielding body 14 is within a range of 2.5 to 3.0.

In a case where the ratio T12*a*/T14 is larger than a value within the range, it is difficult to move the light shielding body 14 which is in the light transmitting state and is located on the light guide plate portion 12*b* side in the tubular portion 13 toward the hole portion 16. As a result, this is not preferable. Further, in a case where the ratio T12*a*/T14 is smaller than a value within the range, a shadow of the light shielding body 14 which is in the light transmitting state and is located on the light guide plate portion 12*b* side in the tubular portion 13 is visually recognized from the front surface side of the hole portion 16. That is, an insufficient white-out state may be caused. For this reason, this is not preferable because the insufficient white-out state may affect the display state.

A ratio T12*b*/T14 of the thickness dimension T12*b* of the light guide plate portion 12*b* to the diameter dimension T14 of the light shielding body 14 is within a range of 0.7 to 2.8, and more preferably, in a range of 1.7 to 1.8.

In a case where the ratio T12*b*/T14 is larger than a value within the range, an amount of a resin for forming the light-transmitting holder 12 greatly increases, and a thickness dimension of the light stippling display device 10 unnecessarily increases. As a result, this is not preferable. Further, in a case where the ratio T12*b*/T14 is smaller than a value within the range, durability of the light-transmitting holder 12 is insufficient. As a result, this is not preferable.

A ratio T14/T11*a* of the diameter dimension T14 of the light shielding body 14 to the thickness dimension T11*a* of the magnetized sheet 11*a* is within a range of 5 to 50, and more preferably, in a range of 6 to 10.

In a case where the ratio T14/T11*a* is larger than a value within the range, the light shielding body 14 may not be reliably attracted by the magnetic force of the magnetized sheet 11*a*. As a result, this is not preferable. Further, in a case where the ratio T14/T11*a* is smaller than a value within the range, it is difficult to remove the light shielding body 14 from the hole portion 16 when the light shielding body 14 is pressed. As a result, this is not preferable because operability is deteriorated.

A ratio T16*p*/T16 of the pitch dimension T16*p* of the hole portion 16 to the diameter dimension T16 of the opening of the hole portion 16 is within a range of 1.7 to 1.8.

In a case where the ratio T16*p*/T16 is larger than a value within the range, dots on the display are too coarse. As a result, this is not preferable. Further, in a case where the ratio T16*p*/T16 is smaller than a value within the range, an area of the magnetized sheet 11*a* around the hole portion 16 is too small, and the light shielding body 14 may not be reliably attracted by the magnetic force of the magnetized sheet 11*a*. As a result, this is not preferable.

Further, a magnetized state of the magnetized sheet 11*a* can be set as follows. The magnetic force of the magnetized sheet 11*a* is set to a strength which is sufficient to ensure an operation in which the light shielding body 14 is fitted into the hole portion 16 and to allow an operation in which the contacted light shielding body 14 is easily removed from the hole portion 16. The magnetic force varies mainly depending on the mass of the light shielding body 14. For example, the magnetic force around the hole portion 16 may be set to be within a range of 15 gauss to 25 gauss.

In a case where the magnetic force of the magnetized sheet 11*a* in the magnetized state is larger than a value within the range, a pressing force required to separate the light shielding body 14 when the light shielding body 14 is switched to the light transmitting state is too large, and the light shielding body 14 may not be separated. As a result, this is not preferable. Further, in a case where the thickness dimension T11*a* of the magnetized sheet 11*a* is smaller than a value within the range, the magnetic force required to attract the light shielding body 14 may be insufficient. As a result, this is not preferable.

At this time, preferably, the thickness dimension T11*a* of the magnetized sheet 11*a* is set to be within the range.

Further, the strength of the magnetic force of the magnetized sheet 11*a* and the diameter dimension T14 of the light shielding body 14 can also be set so as to satisfy the operation conditions.

In a case where the magnetic force of the magnetized sheet 11*a* in the magnetized state is larger than a value within the range, a pressing force required to separate the light shielding body 14 when the light shielding body 14 is switched to the light transmitting state is too large, and the light shielding body 14 may not be separated. As a result, this is not preferable. Further, in a case where the thickness dimension T11*a* of the magnetized sheet 11*a* is smaller than a value within the range, the magnetic force required to attract the light shielding body 14 may be insufficient. As a result, this is not preferable.

In the light stippling display device 10 according to the present embodiment, the dimension of each portion is set as described above. Thus, reliability of display can be improved, and operability can be improved. Thereby, it is possible to improve product performance.

The light stippling display device 10 according to the present embodiment can solve a problem that a light stippling display device using a light emitting element such as a light emitting diode or a liquid crystal can display only content which is input in advance. Thereby, the light stippling display device 10 that can freely perform writing can be provided at low cost.

In the light stippling display device, the hole portion 16 is opened and closed by the light shielding body 14 having a spherical shape. Thereby, regardless of brightness of a room, the light stippling display device can easily perform display from any angle.

There is no difficulty in viewing due to reflection on a plate surface that is caused by a view angle. In addition, as compared with a liquid crystal or the like, the light stippling display device can have a wider viewing angle.

In a case where a white ink or a whiteboard pen is used, it is possible to prevent generation of dust and reduce discomfort of fingertips.

In a case where a quick-drying ink such as a whiteboard pen is used, it is possible to hygienically and easily perform writing and erasing without solvent odor.

Figure 10:
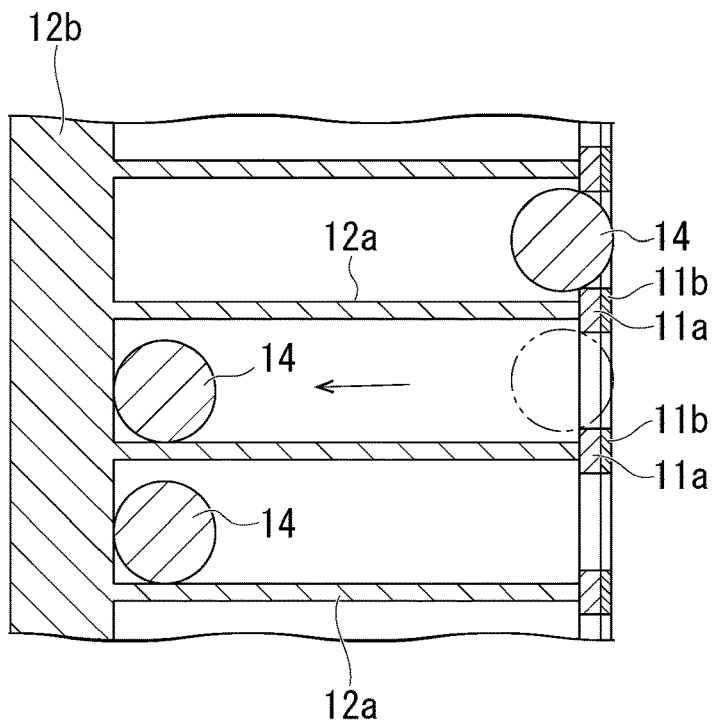
FIG. 10 is an enlarged sectional view showing an example in which a backlight is not provided in the light stippling display device according to the first embodiment of the present invention.

In the present embodiment, a configuration including the backlight 15 is adopted. On the other hand, as shown in FIG. 10, a configuration without the backlight may be adopted. In this case, preferably, the rear surface side of the light stippling display device 10 is used, for example, in a bright state such as a state where the rear surface is irradiated with sunlight.

In the present embodiment, the tubular portion 13 is formed as a cylindrical recess portion in the light-transmitting holder 12. On the other hand, the tubular portion 13 having another sectional shape may be formed.

Figure 11:
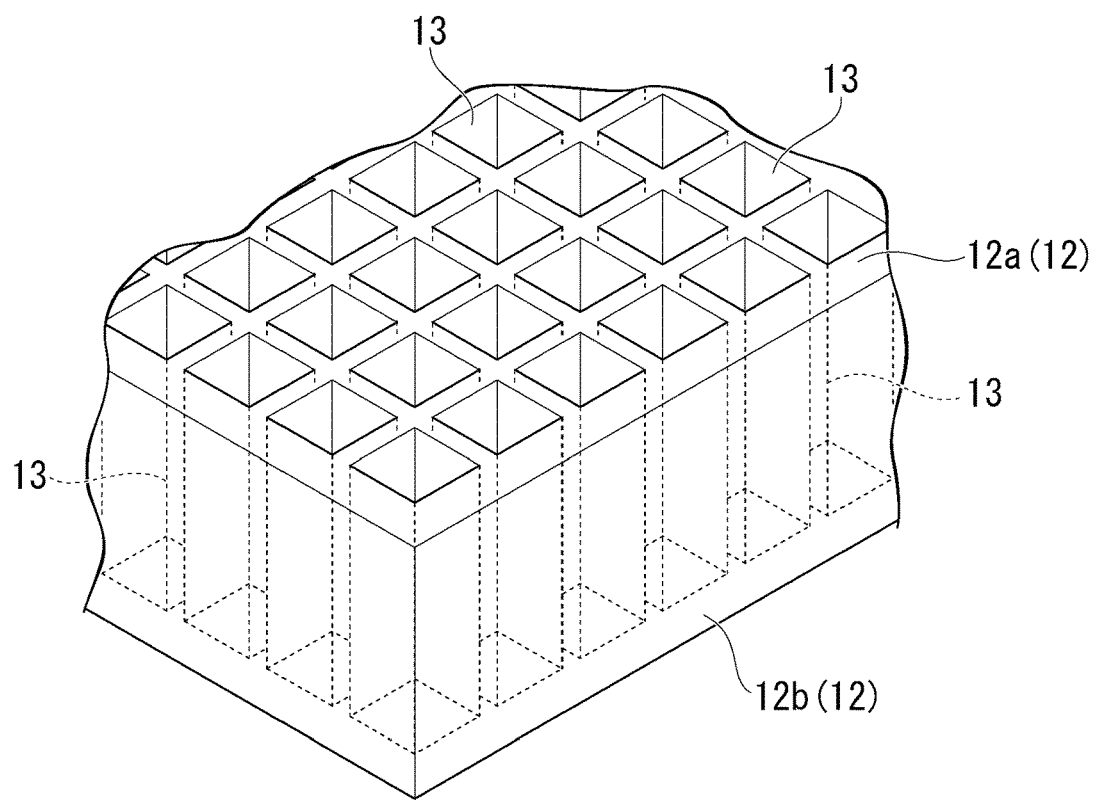
FIG. 11 is a perspective view showing another example of the light-transmitting holder of the light stippling display device according to the first embodiment of the present invention.

For example, as shown in FIG. 11, the tubular portion 13 may be formed as a recess portion having a rectangular section. In this example, a configuration in which the side wall portions 12a are continuous is adopted. On the other hand, a configuration in which the side wall portions 12a are made of plates which are formed as bodies separated from the light guide plate portion 12b and are combined in a grid pattern may be adopted.

Figure 12:
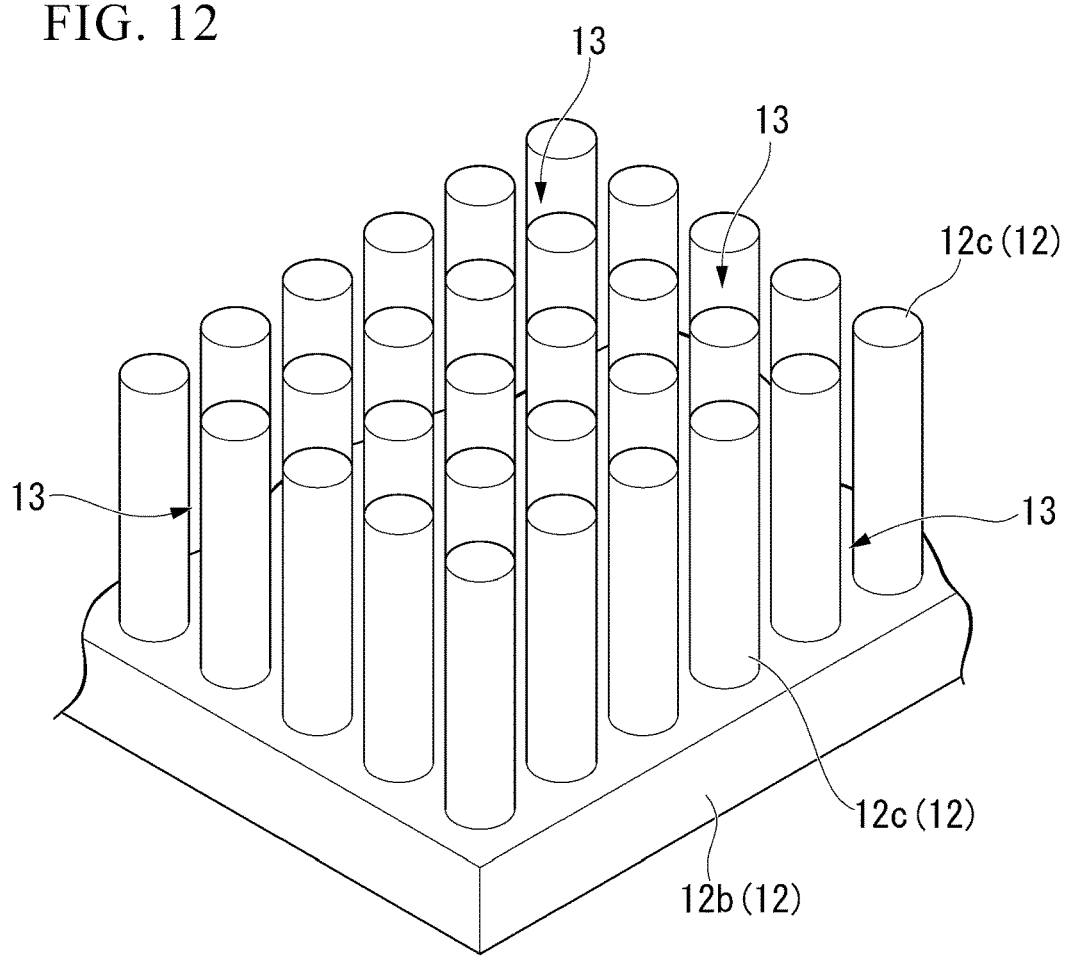
FIG. 12 is a perspective view showing another example of the light-transmitting holder of the light stippling display device according to the first embodiment of the present invention.

Alternatively, as shown in FIG. 12, a configuration in which the tubular portions 13 are formed by a plurality of rod-shaped portions 12c which are erectly provided from the light guide plate portion 12b and the light shielding body 14 moves in the tubular portion 13 may be adopted. In this case, the rod-shaped portions 12c may be erectly provided in a state of being separated from each other and parallel to each other. In addition, a configuration in which the plurality of rod-shaped portions 12c are formed separately from the light guide plate portion 12b and the rod-shaped portions 12c are connected to the light guide plate portion 12b may be adopted.

Further, in the light stippling display device 10 according to the present embodiment, as shown in FIG. 1, a configuration in which the tubular portion 13 is formed so as to match with a normal line of the display plate portion 11 and the display plate portion 11 is tilted at a predetermined angle so as to face upward has been described. On the other hand, the present invention is not limited to the embodiment.

Figure 13:
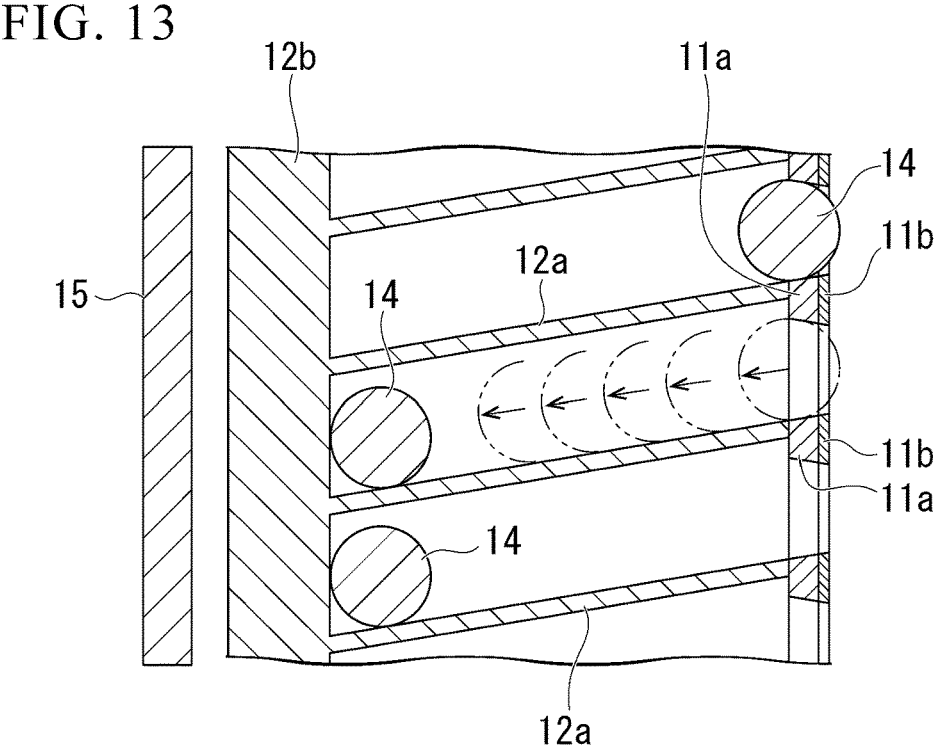
FIG. 13 is an enlarged sectional view showing another example of the light stippling display device according to the first embodiment of the present invention.

For example, in the light stippling display device 10, as shown in FIG. 13, a configuration in which the axial line of the tubular portion 13 is inclined downward with respect to a normal direction of the display plate portion 11 as the tubular portion 13 is separated from the display plate portion 11 may be adopted. In this case, the plurality of tubular portions 13 are all disposed such that the axial lines of the cylindrical tubular portions 13 are parallel to each other.

With this configuration, the light stippling display device 10 can be used in a state where the display plate portion 11 is disposed in a vertical direction.

In this case, an angle formed by the axial line of the tubular portion 13 and the normal line of the display plate portion 11 may be within a range in which visibility of the display can be ensured and an operation of opening and closing the hole portion 16 by the light shielding body 14 can be performed.

INDUSTRIAL APPLICABILITY

The present invention can be utilized for alternative use products for blackboards and whiteboards, alternative use products for tablet terminals, children's toys, display boards for outdoor use, and the like.

REFERENCE SIGNS LIST

10: Light stippling display device
11: Display plate portion
11A: Frame portion
11a: Magnetized sheet
11b: Cover plate portion
12: Light-transmitting holder
12a: Side wall portion
12b: Light guide plate portion
12c: Rod-shaped portion
13: Tubular portion
14: Light shielding body
15: Backlight
16: Hole portion
21: Brush (drawing means)
22: Eraser (erasing means)

What is claimed is:
1. A light stippling display device comprising:
a display plate portion that is erectly provided and has a front surface side of the display plate portion on which a plurality of hole portions are formed; and
a light shielding body that is provided corresponding to each hole portion, wherein
the light stippling display device performs light stippling by allowing light transmitting and light shielding from a rear surface side of the display plate portion to the front surface side by moving the light shielding body,
the display plate portion is formed of a magnetized sheet which is magnetized,
the light shielding body is a magnetic ball having a spherical shape,
a light-transmitting holder including a tubular portion in which the light shielding body rolls and moves is provided on the rear surface side of the display plate portion, the tubular portion being provided corresponding to each hole portion,
a position of the light shielding body is switched between a light transmitting state and a light shielding state, the light transmitting state being a state where the light shielding body is disposed in the light-transmitting holder at a position separated from the display plate portion, and the light shielding state being a state where the light shielding body is attracted by a magnetic force of the display plate portion and is fitted into the hole portion,
a flux of the magnetic force that is formed by the magnetized sheet has directivity for a center of the hole portion with respect to the light shielding body in the display plate portion which is magnetized on both sides in a case where the light shielding body is switched to the light shielding state, and
a ratio of a diameter dimension of an opening of the hole portion to a diameter dimension of the light shielding body is set to be within a range of 0.86 to 0.95.
2. The light stippling display device according to claim 1, wherein, in the light shielding state, the light shielding body is in a state of protruding from the opening of the hole portion within a range of one-fourth of the diameter of the light shielding body to one-third of the diameter of the light shielding body.

3. The light stippling display device according to claim 1, wherein, in the display plate portion, a thickness dimension of the magnetized sheet is set to be within a range of 0.05 mm to 0.3 mm.

4. The light stippling display device according to claim 1, wherein a ratio of a length dimension of the tubular portion of the light-transmitting holder to the diameter dimension of the light shielding body is set to be within a range of 2.5 to 3.0.

5. The light stippling display device according to claim 1, wherein a ratio of the diameter dimension of the light shielding body to a thickness dimension of the magnetized sheet is set to be within a range of 6 to 10.

* * * * *